(12) United States Patent
Selman et al.

(10) Patent No.: US 9,074,468 B1
(45) Date of Patent: *Jul. 7, 2015

(54) METHOD FOR REAL-TIME STREAMING OF WELL LOGGING DATA WITH SELF-ALIGNING SATELLITES

(75) Inventors: Thomas H. Selman, Midland, TX (US); Matthew J. Jennings, Midland, TX (US)

(73) Assignee: SELMAN AND ASSOCIATES, LTD., Midland, TX (US)

( * ) Notice: Subject to any disclaimer, the term of this patent is extended or adjusted under 35 U.S.C. 154(b) by 684 days.

This patent is subject to a terminal disclaimer.

(21) Appl. No.: 13/356,533

(22) Filed: Jan. 23, 2012

Related U.S. Application Data

(60) Provisional application No. 61/436,926, filed on Jan. 27, 2011.

(51) Int. Cl.
  *E21B 47/12* (2012.01)
  *G06F 7/48* (2006.01)
  *E21B 47/18* (2012.01)

(52) U.S. Cl.
  CPC .............. *E21B 47/18* (2013.01); *E21B 47/122* (2013.01)

(58) Field of Classification Search
  CPC ....... E21B 15/00; E21B 47/122; E21B 47/12; E21B 47/024; E21B 47/18
  USPC ........ 340/580–589, 853–856; 703/10; 175/27
  See application file for complete search history.

(56) References Cited

U.S. PATENT DOCUMENTS

| | | | |
|---|---|---|---|
| 2002/0083182 A1* | 6/2002 | Alvarado et al. ............. | 709/231 |
| 2005/0159212 A1* | 7/2005 | Romney et al. ................. | 463/25 |
| 2008/0024318 A1* | 1/2008 | Hall et al. ................. | 340/853.3 |
| 2008/0173480 A1* | 7/2008 | Annaiyappa et al. ........... | 175/24 |
| 2009/0214040 A1* | 8/2009 | Funk et al. ..................... | 380/277 |
| 2010/0235101 A1* | 9/2010 | Aamodt et al. ................... | 702/9 |
| 2010/0306589 A1* | 12/2010 | Bennett et al. .................. | 714/30 |
| 2011/0083854 A1* | 4/2011 | Jennings ....................... | 166/348 |
| 2011/0273625 A1* | 11/2011 | McMahon et al. ............ | 348/734 |
| 2011/0320819 A1* | 12/2011 | Weber et al. .................. | 713/176 |
| 2012/0037422 A1* | 2/2012 | Rasheed ....................... | 175/50 |
| 2012/0097823 A1* | 4/2012 | Murray et al. ................ | 248/550 |
| 2012/0101953 A1* | 4/2012 | James et al. .................. | 705/317 |
| 2012/0115523 A1* | 5/2012 | Shpak ........................... | 455/507 |
| 2014/0192708 A1* | 7/2014 | Wise ............................. | 370/316 |

* cited by examiner

*Primary Examiner* — Hai Phan
*Assistant Examiner* — Royit Yu
(74) *Attorney, Agent, or Firm* — Buskop Law Group, PC; Wendy Buskop

(57) ABSTRACT

A method for providing real-time streaming drilling data transmission services using self-aligning satellites. The method can include receiving and transmitting the drilling data using client devices, radio boxes, a processor, a local network, a satellite network, a router and switch, a satellite modem, and self-aligning satellite dishes. The drilling data can be transmitted to a remote network operation center and a remote central server. The remote central server can real-time stream the remote client devices.

20 Claims, 9 Drawing Sheets

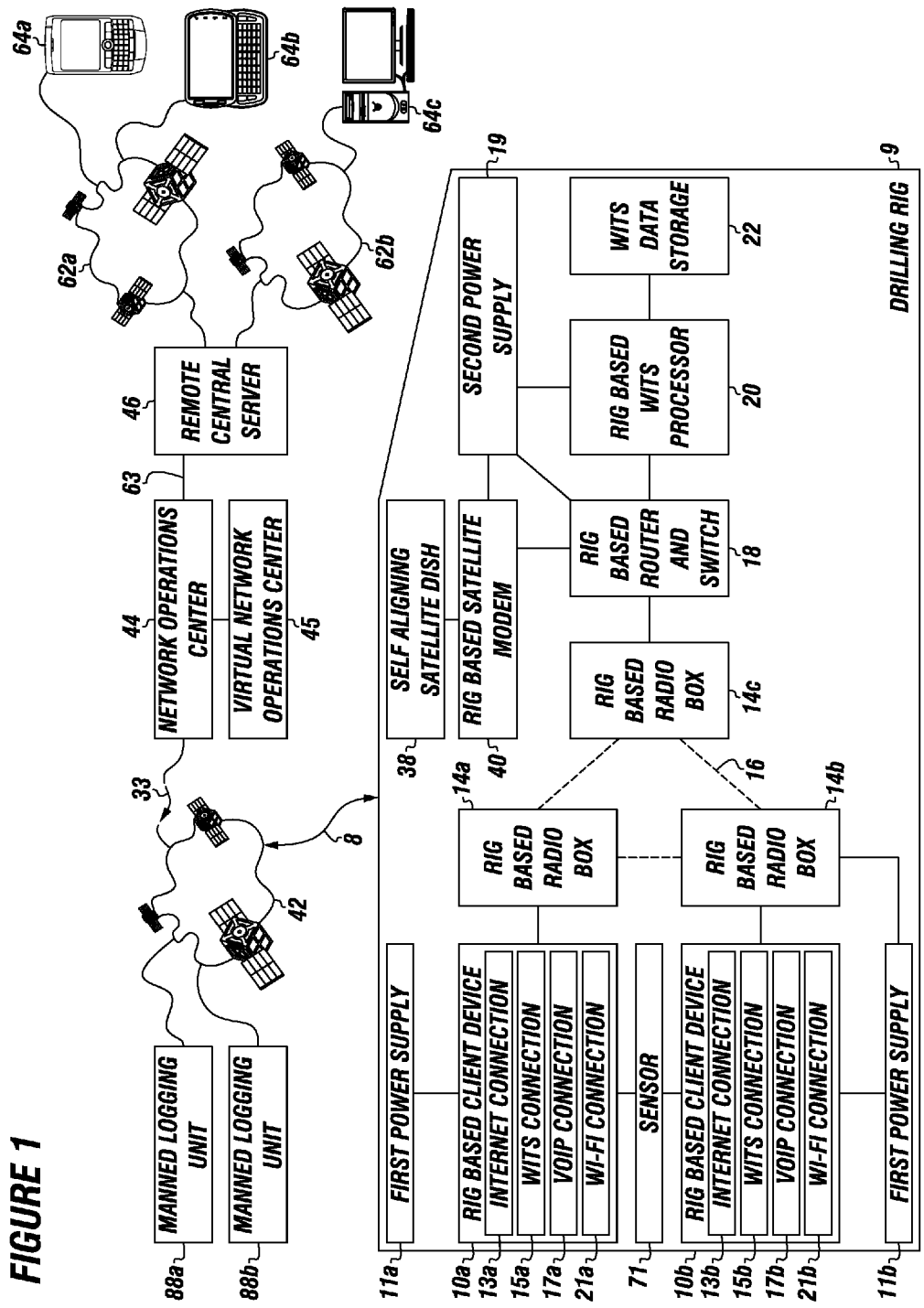

FIGURE 2

| | |
|---|---|
| 22 | WITS DATA STORAGE |
| 24 | COMPUTER INSTRUCTIONS TO RECEIVE, STORE, AND SEND THE DRILLING DATA AND THE ASSOCIATED WELL LOGGING DATA |
| 26 | COMPUTER INSTRUCTIONS TO STORE CONFIGURATIONS AND SETTINGS FOR THE PLURALITY OF RIG BASED CLIENT DEVICES, THE RIG BASED WITS PROCESSOR, THE RIG BASED ROUTER AND SWITCH, OR COMBINATIONS THEREOF |
| 27 | COMPUTER INSTRUCTIONS TO PERFORM DIAGNOSTICS ON THE PLURALITY OF RIG BASED CLIENT DEVICES USING DIAGNOSTIC TOOLS |
| 28 | COMPUTER INSTRUCTIONS TO ONLINE CONFIGURE AND RECONFIGURE THE RIG BASED WITS PROCESSOR, THE RIG BASED ROUTER AND SWITCH, THE RIG BASED CLIENT DEVICES, OR COMBINATIONS THEREOF WHILE THE RIG BASED WIRELESS LOCAL AREA NETWORK IS OPERATING WITHOUT SHUTTING THE RIG BASED WIRELESS LOCAL AREA NETWORK DOWN |
| 30 | COMPUTER INSTRUCTIONS TO PERFORM DIAGNOSTICS ON THE RIG BASED WIRELESS LOCAL AREA NETWORK |

5910 - UNIVERSITY 4-29C #1
LAST UPDATED: 01/19/2011 4:52:31 PM
OFF BOTTOM

810

| HOLE DEPTH | BIT DEPTH | LAG DEPTH | TOTAL GAS | METHANE |
|---|---|---|---|---|
| 7906.73 | 7905.51 | 7878.00 | 28.15 | 7906.73 |
| FT | FT | FT | UNITS | UNITS |
| ETHANE | PROPANE | ISO-BUTANE | NOR-BUTANE | DR |
| 83.26 | 118.33 | 5.43 | 54.63 | 1.05 |
| UNITS | UNITS | UNITS | UNITS | MIN/FT |
| ROP | WOB | HOOK LOAD | BLOCK POS | PUMP PRES |
| 57.38 | 0.07 | 162.55 | 21.23 | 1009.30 |
| FT/HR | klbs | klbs | FT | PSI |
| PUMP 1 | PUMP 2 | PUMP 3 | LAG STKS | TORQUE |
| 0 | 65 | 0 | 2737 | 0.00 |
| STK/MIN | STK/MIN | STK/MIN | - | KFT LBS |
| ROTARY | CC UNITS | TC UNITS | CARRIER PRES | SEL TOTAL STK |
| 65 | 28.15 | -22.86 | 6.13 | 498785.95 |
| RPM | UNITS | UNITS | PSI | STK |
| SEL LAG STK | TOTAL GAS | ROP-AVG | CASNG PRES | METHANE-RT |
| 496049.34 | 28.15 | 0.00 | 0.00 | 10 |
| STK | UNITS | FT/HR | PSI | UNITS |
| ETHANE-RT | PROPANE-RT | ISO-BUTANE-RT | NOR-BUTANE-RT | VENDOR1 |
| 4 | 6 | 0 | 2 | 0 |
| UNITS | UNITS | UNITS | UNITS | - |
| SEL HOLE DEPTH | IR TG UNITS | IR CO2 % | TG TEMPERATURE | GC TEMPERATURE |
| 7906.70 | -62445.63 | -112.75 | 0.00 | 0.00 |
| FT | UNITS | % | DEG F | DEG F |
| TG FLOW RATE | GC FLOW RATE | FUEL LEVEL | | |
| 1.90 | 1.90 | 0.00 | | |
| SCFH | SCFH | GAL | | |

820 — HOLE DEPTH (header)
812 — 7906.73 (value)
830 — FT (units)

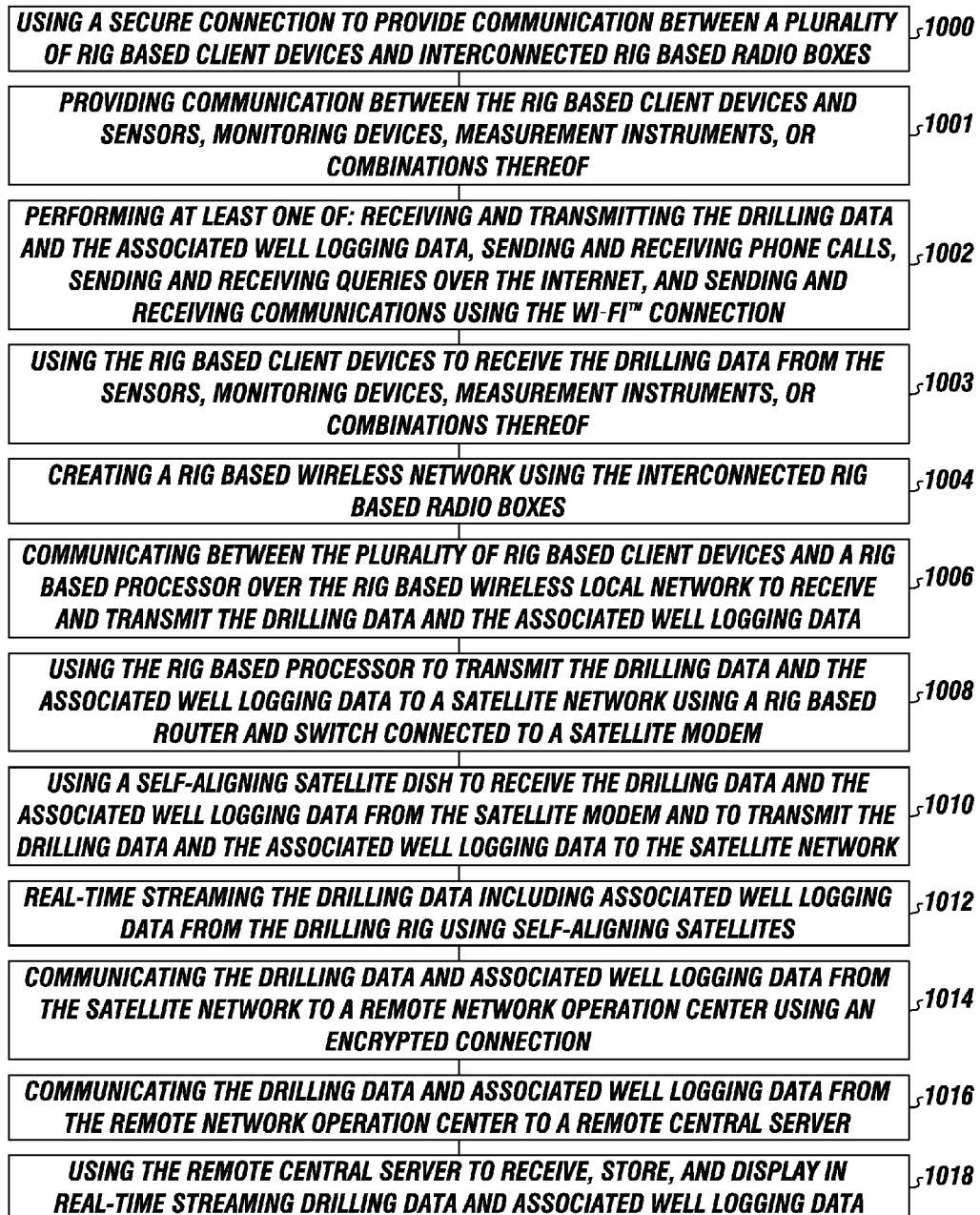

FIGURE 7B (7A)

- 1020 — USING THE REMOTE CENTRAL SERVER TO ACTIVATE AN ALARM WHEN THE DRILLING DATA OR ASSOCIATED WELL LOGGING DATE EXCEEDS OR FALLS BENEATH A PRESET LIMIT
- 1022 — USING THE REMOTE CENTRAL SERVER TO FORM AN EXECUTIVE DASHBOARD OF THE DRILLING DATA OR ASSOCIATED WELL LOGGING DATA
- 1024 — USING THE REMOTE CENTRAL SERVER TO TRACK DRILLING PROGRESS ON MULTIPLE WELLS
- 1026 — USING THE REMOTE CENTRAL SERVER TO SCALE THE DRILLING DATA
- 1028 — USING THE REMOTE CENTRAL SERVER TO TRANSFER THE DRILLING DATA AND THE ASSOCIATED WELL LOGGING DATA A REMOTE CLIENT DEVICE
- 1030 — USING THE REMOTE CENTRAL SERVER TO A TRACK DRILLING PROGRESS ON MULTIPLE WELLS, SCALE DRILLING DATA, AND COMBINATIONS THEREOF
- 1032 — USING THE REMOTE CENTRAL SERVER TO GENERATE A WELL LOG
- 1034 — USING THE REMOTE CENTRAL SERVER TO PERFORM REMOTE DIAGNOSTICS AND RECONFIGURE SOFTWARE ONLINE WITHOUT TAKING DOWN THE LOCAL WIRELESS AREA NETWORK
- 1036 — USING THE REMOTE CENTRAL SERVER TO STREAM THE DRILLING DATA, THE ASSOCIATED WELL LOGGING DATA, THE EXECUTIVE DASHBOARD, OR COMBINATIONS THEREOF TO THE REMOTE CLIENT DEVICE FOR DISPLAY THEREON
- 1038 — CREATING CLIENT ACCOUNTS IN THE CENTRAL SERVER
- 1040 — INPUTTING INFORMATION ON OTHER MANNED LOGGING UNITS
- 1042 — MONITORING DATA TRAFFIC TO A CENTRAL POLLING DROP POINT FOR THE PROCESSOR
- 1044 — MONITORING DRILLING DATA FOR USE IN GENERATING A WELL LOG
- 1046 — MONITORING THE DRILLING DATA FOR USE IN STORING AND DISPLAYING AS REAL-TIME STREAMING DRILLING DATA
- 1048 — USING A VIRTUAL NETWORK OPERATIONS CENTER AS THE NETWORK OPERATIONS CENTER
- 1050 — USING A VIRTUAL NETWORK OPERATIONS CENTER WITH THE NETWORK OPERATIONS CENTER
- 1052 — USING AT LEAST TWO CONNECTED NETWORKS AS THE NETWORK
- 1054 — USING AN ENCRYPTION MODULE TO PROVIDE AN ENCRYPTED COMMUNICATION BETWEEN THE NETWORK OPERATION CENTER AND THE CENTRAL SERVER, AND SECURE COMMUNICATION FROM A USER WITH A CLIENT DEVICE OR A RIG BASED CLIENT DEVICE (7C)

METHOD FOR REAL-TIME STREAMING OF WELL LOGGING DATA WITH SELF-ALIGNING SATELLITES

CROSS REFERENCE TO RELATED APPLICATIONS

The present application claims priority to and the benefit of U.S. Provisional Patent Application Ser. No. 61/436,926 filed on Jan. 27, 2011, entitled "METHOD FOR REAL-TIME STREAMING OF WELL LOGGING DATA WITH SELF-ALIGNING SATELLITES". This reference is hereby incorporated in its entirety.

FIELD

The present embodiments generally relate to a method for real-time streaming of well logging data using self-aligning satellites.

BACKGROUND

A need exists for a method using a self-adjusting and online configurable satellite communication system to stream drilling data.

A need exists for a method for continuously receiving drilling data from on-rig client devices and monitors, processing the drilling data at the site into well logging data, and transmitting the well logging data back to on-rig client devices while simultaneously transmitting to a satellite network for transmission to a central server.

A need exists for a method using a central server to provide a secure connection and encrypted drilling data and well logs to client devices that are not located on the rig, allowing for fast safety decisions, quickly implemented changes in drilling direction, and preventing rigs from catching fire, exploding, or causing environmental damage.

A need exists for a method for transmitting drilling data to on-rig and remote client devices quickly and efficiently, allowing for operators and remote executives to know a status of the drilling operation in real-time with streaming data, thereby allowing for fast and efficient decision making regarding the drilling operations.

The present embodiments meet these needs.

BRIEF DESCRIPTION OF THE DRAWINGS

The detailed description will be better understood in conjunction with the accompanying drawings as follows:

FIG. 1 depicts an overview of an embodiment of the system.

FIG. 2 depicts an embodiment of a WITS data storage.

FIG. 6 depicts an embodiment of a well log.

FIGS. 7A-7C depict an embodiment of an encryption module.

Figure 3:
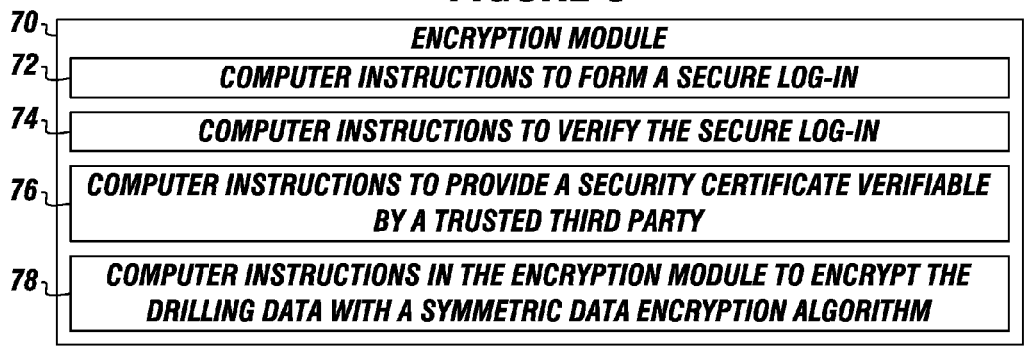
FIG. 3 depicts an embodiment of an encryption module.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for providing well logging and drilling data transmission services. The method can include real-time streaming the drilling data, including associated well logging data, from a drilling rig using self-aligning satellites.

The method can include using a secure connection to provide communication between a plurality of rig based client devices and interconnected rig based radio boxes.

WITS stands for well site information transfer specification, which can be a communications format used for the transfer of a wide variety of well site data from one computer system to another.

Each rig based client device can include an internet connection, a WITS connection, a voice over internet protocol phone connection "VoIP", and a WI-FI™ connection, or combinations thereof.

The method can include receiving and transmitting the drilling data and the associated well logging data. For example, the rig based client devices can receive the drilling data from sensors, monitors, measurement devices, and like instrumentation. The rig based client devices can be in direct communication with the sensors, monitors, measurement devices, and like instrumentation. The rig based client devices can then transmit the received drilling data, such as through the internet connection, WITS connection, voice over internet protocol phone connection, WI-FI™ connection, the like, or combinations thereof. The rig based client devices can transmit the drilling data to the interconnected rig based radio boxes.

The method can include sending and receiving phone calls using the rig based client devices along with the internet connection, voice over internet protocol phone connection, the like, or combinations thereof. The method can include sending and receiving queries over the internet. The method can include sending and receiving communications using the WI-FI™ connection.

The method can include creating a rig based wireless network using the interconnected rig based radio boxes.

The method can include communicating between the plurality of rig based client devices and a rig based processor over the rig based wireless local network to receive and transmit the drilling data and the associated well logging data.

The method can include using the rig based processor to transmit the drilling data and the associated well logging data to a satellite network using a rig based router and switch connected to a satellite modem.

The method can include using a self-aligning satellite dish to receive the drilling data and the associated well logging data from the satellite modem and to transmit the drilling data and the associated well logging data to the satellite network.

The method can include communicating the drilling data and associated well logging data from the satellite network to a remote network operation center using an encrypted connection.

The method can include communicating the drilling data and associated well logging data from the remote network operation center to a remote central server.

The method can include using the remote central server to receive, store, and display in real-time streaming drilling data and associated well logging data.

The method can include using the remote central server to activate an alarm when the drilling data or associated well logging date exceeds or falls beneath a preset limit.

The method can include using the remote central server to form an executive dashboard of the drilling data or associated well logging data. The executive dashboard of drilling data can be used by CEOs, presidents, public affairs officers, safety officers at a location remote to the rig, or other users and operators to monitor progress and cause change in drilling plans.

The method can include using the remote central server to track drilling progress on multiple wells. As such, the method can be used to provide for fast responses to situations occurring at multiple drilling rigs.

The method can include using the remote central server to scale the drilling data. The scaling and the drilling data and the streaming of the executive dashboard can occur continuously, and can be updated continuously from continuously received drilling data from the drilling rig.

The method can include using the remote central server to transfer the drilling data and the associated well logging data to a remote client device.

The method can include using the remote central server to a track drilling progress on multiple wells, scale drilling data.

The method can include using the remote central server to generate a well log.

The method can include using the remote central server to perform remote diagnostics and reconfigure software online without taking down the local wireless area network.

The method can include using the remote central server to stream the drilling data, the associated well logging data, the executive dashboard, or combinations thereof to the remote client device for display thereon.

The method can include creating client accounts in the central server. For example, an administrator of the central server can create the client accounts.

The method can include inputting information on other manned logging units into the central server, which can be performed by the administrator.

The method can include monitoring data traffic to a central polling drop point for the processor, which can be performed by the administrator.

The method can include monitoring drilling data for use in generating a well log, which can be performed by the administrator.

The method can include monitoring the drilling data for use in storing and displaying as real-time streaming drilling data, which can be performed by the administrator.

The method can include using a plurality of processors connected in series to engage the central polling drop point to pick up drilling data from other manned logging units to record, store, and post drilling data provided from the rig based client device and the rig based processor to a website. The website can be presented by the central server to the network.

One or more embodiments of the method can be implemented using one or more embodiments of the system disclosed herein.

The system can be used to provide continuous real-time streaming of drilling data and well logging data from a drilling rig, such as an oil or gas drilling rig.

The system can provide a unique way to collect, compile, and transmit drilling data to on-rig and remote client devices, providing a single central server for access of the drilling data by operators and other users. The system can be used to provide a single access point for drilling data acquired from multiple electronic drilling recorder providers, mud logging providers, and other third party providers from multiple drilling rigs and/or locations using the central server.

The system can provide WI-FI™, Voice over Internet Protocol (VoIP) telephone communications, and Internet access from a plurality of rig based client devices on the drilling rig. For example, the system can use a local area network of radio devices that can be in communication with self-aligning satellite dishes and a satellite network. The satellite network can provide a secure communication with a central server for secure communication to non-rig based remote client devices. As such, the system can be used to receive drilling data and well logging data from rig based client devices and to transmit the drilling data to rig based client devices and remote client devices in a continuous real-time stream.

The system can include a rig based well site information transfer specification "WITS" processor that can be in communication with a WITS data storage and a power supply, such as a second power supply. The rig based WITS processor can be configured to: receive the drilling data from the plurality of rig based client devices, and form well logging data for transmission to rig based client devices and remote client devices through a rig based router and switch.

The WITS system, including the rig based WITS processor and the WITS data storage, can be a multi-level format, and can be used to achieve entry point with higher levels. At lower levels, a fixed format ASCII data stream can be used. At higher levels, a self-defining customizable data stream can be used. A WITS data stream can include discrete data records, each of which can be generated independently of other data record types, and can have a trigger variable and sampling interval. The WITS system can include a remote computer system to send instructions to set or change certain parameters, including the type of data transmitted and the interval for transmission. The WITS system can specify a format for data transmission, and define a basic set of pre-defined records to which user-defined record types can be added.

The rig based WITS processor can be used with the local area network and rig based client devices to do on-the-spot compiling of the drilling data, well logging data, and to provide alarms to operators on the drilling rig via continuous executive dashboards for operators and/or executives. The system can also provide alarms to executives of a drilling company using continuous remote executive dashboards via the self-aligning satellite dishes, satellite network, and encrypted communications with a network operations center and a remote central server.

The system can provide various benefits including safety benefits, operational benefits, geological benefits, and cost benefits. The safety benefits can include detecting hydrocarbons and other gasses to prevent the occurrence of explosions, blowouts, poisoning, and other dangerous situations. The operational benefits can include allowing executives at remote locations to view real-time streaming data and to be enabled to make timely decisions based on the real-time streaming data. The geological benefits can include locating hydrocarbon and gas reservoirs, as well as other geological features. The cost benefits can allow executives at remote locations to view real-time streaming data and to be enabled to make more cost effective decisions based on the real-time streaming data.

The system can include self-aligning satellites in communication with the rig based WITS processor for transmitting and receiving the drilling data and associated well logging data.

In one or more embodiments, the rig based client devices can receive drilling data from sensors, monitoring devices, or other measurement instruments, such as chromatographs, mud pumps, mud volume totalizers, mud pit volume totalizers, mud pit monitors, drill switches, gas sensors, depth sensors, on-off bottom switches, flame ionization detectors, catalytic combustion detectors, thermal conductivity detectors, infrared gas detectors, other gas detection devices, other gas measuring devices, weight on bit transducers, drilling rig servers, the like, or combinations thereof.

Examples of the drilling data, including the associated well logging data, that can be transmitted and received include: hole depth, drill bit depth, lag depth, total gas, methane content, ethane content, propane content, isobutane content, pump pressure, torque, carrier air pressure, casing pressure, fluorescence, drilling mud content, well bore depths, chromatograms, lag time information, rate of penetration into the wellbore, weight on the drill bit, hook load, stand pipe pressure, pump stroke rate, rotary table speed, mud tank levels, measured depth of the wellbore, true vertical depth of the wellbore, measured depth of the drill bit, true vertical depth of the drill bit, measured depth at which the drilling data is received such as a depth of a geological or gas sample, gamma ray reading data, resistivity readings, caliber readings, temperature readings, any other data measured during the drilling of a wellbore, and other related drilling information.

Each rig based client device can be connected to, or otherwise in communication with, a power supply, such as an on-rig power supply. The power supply can be batteries or another type of on-rig power source.

The rig based client devices can be a client indoor unit (CIDU) made by Selman and Associates, Ltd. of Midland, Tex., or other rig based client devices configured to receive and transmit the drilling data from the sensors, monitoring devices, or other measurement instruments using one or more communication pathways. For example, each rig based client device can have an Internet connection, a WITS connection, a Voice over Internet Protocol phone connection (VoIP), and a WI-FI™ connection for communication of the drilling data and the associated well logging data. The WITS connection can be a port for receiving the drilling data and transferring the drilling data to the rig based WITS processor.

Each rig based client device can be adapted to: receive and transmit the drilling data and the associated well logging data, send and receive phone calls, send and receive queries over the Internet, send and receive communications using the WI-FI™ connection, or combinations thereof. For example, the phone calls can be used to allow a rig manager or operator to call headquarters to update personnel and executives on a status of drilling operations, to call for help in emergency situations, to request supplies, or the like. Providing for phone calls can be useful because many drilling rigs are disposed at remote locations where there is otherwise no phone service. For example, the Internet can be used by the rig manager, operator, or a drilling supervisor to send and receive reports, emails, and to access remote databases, such as company databases, via the Internet connection. For example, the WI-FI™ connection can be by the rig manager, operator, or drilling supervisor to send and receive reports, emails, and to access remote databases, such as company databases, using WI-FI™ enabled portable devices, such as mobile phones, laptops, netbooks, and the like.

A plurality of rig based radio boxes, such as those made by Engenius Technologies of Costa Mesa, Calif., model number EOC5610, can be attached to the drilling rig. When activated, each rig based radio box can form a rig based local area network for connecting to and communicating with each rig based client device. Each rig based radio box can have a bidirectional antenna, a receiver, and transmitter for receiving and transmitting signals. The rig based local area network can be a wireless network, a wired network, or combinations thereof.

A rig based router and switch can be connected to or otherwise in communication with the rig based local area network and a second power supply. An illustrative rig based router and switch can include one made by D-Link of Fountain Valley, Calif. The second power supply can be a rig power supply, such as a generator or a bank of batteries. The rig based router and switch can be configured to receive and transmit signals using the rig based local area network. For example, the rig based router and switch can transmit signals from the rig based local area network to both the rig based WITS processor and one or more self-aligning satellite dishes. An illustrative self-aligning satellite dish can include a General Dynamics Sentinel System Model 2985-140. The satellite network can include equipment made by HughesNet in combination with satellites in orbit.

In operation, the rig based WITS processor can receive the drilling data from the rig based client devices. The rig based WITS processor can then perform compilation of the received drilling data, and can track changes of the received drilling data. For example, compilation of the drilling data can include collecting the various distinct drilling data points, and storing the drilling data. The tracking of the changes to the drilling data can include, for example, determining the presence of a change in a data point. For example, if a measured drill bit depth is first measured at 2545.3 feet, and then the measured drill bit depth is measured at 2545.8 feet, the rig based WITS processor can determine the presence of a change in that data point. The rig based WITS processor can be configured to transmit the data point to rig based client devices and remote client devices only when the presence of a change is determined.

The rig based WITS processor can form well logging data for transmission to the rig based client devices and to the remote client devices using the compiled drilling data. For example, the formation of the well logging data can include forming a table of the compiled drilling data. The drilling data on the table of the compiled drilling data can be simultaneously indexed by measured hole depth, date stamp, and time stamp.

The rig based WITS processor can transmit well logging data and drilling data directly to the self-aligning satellite dish that are in communication with a satellite network through the rig based router and switch.

The WITS data storage can include various computer programs and computer instructions.

The WITS data storage can include computer instructions to receive, store, and send the drilling data and the associated well logging data. For example, the WITS data storage can receive the drilling data and the associated well logging data from the rig based client devices. The WITS data storage can store drilling data and the associated well logging data therein. The WITS data storage can send the drilling data, the associated well logging data, and other WITS information to remote client devices, such as through the satellite network of the self-aligning satellite dish.

The other WITS information can include weather conditions, sea conditions, operator comments, well identification data, vessel motion and mooring status data, an operator name, a well name, Kelly bushing height of the well bore at the surface, an owner name for the well bore, cell phone numbers, other contact information, and similar information.

The WITS data storage can include computer instructions to store configurations and settings for the plurality of rig based client devices, the rig based WITS processor, the rig based router and switch, or combinations thereof. For example, a configuration of a rig client device can include inputting IP addresses, phone numbers, and serial communications port numbers into the rig based client devices. Configuration of the rig based WITS processor and the rig based router and switch can be similarly performed.

The WITS data storage can contain computer instructions to configure and reconfigure online the rig based processor, the rig based router and switch, and combinations thereof, while the network is operating without shutting the network down.

The WITS data storage can include computer instructions to perform diagnostics on the plurality of rig based client devices using diagnostic tools. For example, the diagnostic tools can include indicators that can indicate whether or not the rig based client devices are online, indicators of signal quality from the rig based client devices, indicators of ping times, indicators of current IP addresses, indicators of whether or not the rig based client devices capable of transmitting drilling data, and the like.

The WITS data storage can include computer instructions to perform diagnostics on the local area network. For example, the diagnostic tools can include indicators that can indicate whether or not the local area network is online, indicators of signal quality from the local area network, indicators of ping times, indicators of current IP addresses, and the like. The indicators associated with the diagnostic tools can be visual indicators.

The WITS data storage can include computer instructions to store configurations and settings for the plurality of rig based client devices, the rig based WITS processor, the rig based router and switch, or combinations thereof thereon. For example, the configurations and setting can include communication port numbers for the rig based client devices, IP addresses, a number or type of data points that each rig based client device is configured to send and receive, or the like.

The WITS data storage can include computer instructions to online configure and reconfigure the rig based WITS processor, the rig based router and switch, the rig based client devices, or combinations thereof while the rig based local area network is operating without shutting the rig based local area network down. For example, during operation of the rig based local area network, the rig based WITS processor, the rig based router and switch, and the rig based client devices can be configured as described above and can then be reconfigured as described above.

A rig based satellite modem can be connected to or otherwise in communication with the rig based WITS processor, the rig based router and switch, the second power supply, and the one or more self-aligning satellite dishes through the satellite network for communication with a remote network operation center.

A remote central server can be positioned at a location apart from the rig, such as from about 100 miles to about 2000 miles away from the drilling rig. The remote central server can be any distance from the drilling rig.

The remote central server can include one or more central server processors and a central server data storage connected to or otherwise in communication with the one or more central server processors. A display can be associated or in communication with the remote central server. Information and other data from the remote central server can be displayed on the display and on displays of one or more remote client devices.

The central server data storage can have various computer instructions stored thereon.

The central server data storage can include computer instructions to receive the well logging data and the drilling data from the rig based WITS processor. The well logging data and the drilling data can be received by the remote central server in real-time using data streaming over the satellite network.

The central server data storage can include computer instructions to store the received well logging data and the drilling data therein.

The central server data storage can include computer instructions to display the well logging data and the drilling data using real-time streaming. The well logging data and the drilling data can be displayed on the display of the remote central server and on displays of remote client devices.

The central server data storage can include computer instructions to activate an alarm when the drilling data and/or the well logging data exceeds or falls beneath a preset limit. The preset limit can be a user set preset limit that can be input and stored into the central server data storage. For example, a user can set a high threshold limit for the total hydrocarbon reading of a wellbore. If the measured total hydrocarbon reading exceeds the preset limit set by the user then the alarm can be initiated. The alarm can be any audio alarm, visual alarm, or both. Another example of the alarm can be an alarm that indicates that too much ethane is detected at the well bore.

The central server data storage can have computer instructions to form an executive dashboard of the drilling data and associated well logging data. The executive dashboard can be used by users, such as CEOs, presidents, public affairs officers, safety officers, operators, executives, and other users at a location remote from the drilling rig to monitor progress and to initiate changes in drilling plans. For example, the user can monitor the drilling data. The user can initiate changes to the drilling plans if the user determines that the drilling data indicates a need for the change. For example, the drilling data might indicate that a change in a direction of the drilling is required, that a change in the drilling fluid is required, that the drilling needs to be stopped, or the like.

The executive dashboard can display all of the drilling data and associated well logging data disclosed herein, the name of the well, a time stamp for the data, a view time for the data, WITS information, weather conditions, sea conditions, operator comments, well identification data, vessel motion and mooring status data, pump speed, pump rate, composition of gasses coming from the wellbore, type of rock in the formation, and the like. The executive dashboard can present the data graphically and digitally.

The central server data storage can have computer instructions to track drilling progress on multiple wells simultaneously. For example, the remote central server can use the computer instructions on the central server data storage to track the various drilling data from multiple drilling rigs simultaneously. A user can track the drilling data using the executive dashboard.

The central server data storage can have computer instructions for scaling of drilling data.

An example of scaling of drilling data, with a depth as the y-axis and a data value as the x-axis, can include changing a magnitude of the data value on the x-axis to match a scale to allow at least most of the data values to reside within the scaling for the entirety of the well log. For example, scaling can include fitting drilling data on a graph's x-axis by dividing each value by 100, making a graph that is scaled 0-to-100. Any value less than 100 on the scale will show up in the graph.

In one or more embodiments, if a data value exceeds the maximum point on the scale, the data value can appear on the scale with a visual indicator, indicating that the data value is equivalent to its position on the scale plus the maximum value of the scale. For example, if the maximum on the scale is 100, and the data value is 112, the data value can appear as 12 on the scale with a visual indication that the data value has gone over-scale, thereby indicating that the data value is actually 112.

The central server data storage can have computer instructions for transferring drilling data and well logging data to remote client devices. The remote client devices can be client devices that are not located at the drilling rig.

The central server data storage can have computer instructions to generate a well log using the drilling data. For example, the computer instructions to generate a well log by forming a well log table and by forming a graphical representation of the drilling data. For example, the computer instructions can plot drilling time, plot drilling depth, plot pump pressure, plot torque on the well drilling equipment, plot casing pressure, plot rotary table revolutions per minute, plot mud pit volume, perform mud pit totalizing, display total hydrocarbon readings, display the drilling data, the associated well logging data, or combinations thereof. All of the data and plotted data in the central server data storage can be compiled and presented on the executive dashboard as the well log.

The central server data storage can have computer instructions to perform diagnostics on drilling rig based equipment and drilling rig based software. For example, an administrator can perform the diagnostics. The performance of diagnostics can include the same of the diagnostics of that described above with respect to the rig based WITS processor and WITS data storage, with the ability to configure remotely.

The central server data storage can have computer instructions to reconfigure the drilling rig based equipment and the drilling rig software on-line without taking down or shutting off all or a portion of the rig based local area network. For example, while at least a portion of the rig based local area network is running, the remote central server can use the computer instructions thereon to reconfigure the drilling rig based equipment and the drilling rig software by in a manner substantially similar as described above with respect to the rig based WITS processor and WITS data storage, but from a remote location. The drilling rig based equipment can include the rig based client devices, the rig based WITS processor, the rig based radio boxes, the self-aligning satellite dish, the rig based satellite modem, the rig based local area network, the rig based router and switch, and the like. The drilling rig software can be any software that is operating the drilling rig based equipment and is directly or indirectly accessible through the satellite network.

The system can include an encrypted connection providing a secure connection between the remote network operation center and the remote central server. The encrypted connection can be formed using encryption software. The encryption software can include symmetric encryption, asymmetric encryption, such as RSA encryption, or combinations thereof. The encryption module can include computer instructions to provide a security certificate verifiable by a trusted third party. For example, an RSA encryption with security certificates verifiable by a trusted third party, such as VERISIGN™, can be used.

The encryption module can be installed in the remote central server and the central data storage to provide an encrypted communication between the remote network operation center and the remote central server, and to provide secure communication between users with remote client devices and the remote central server.

In one or more embodiments, the encryption module can include computer instructions to form a secure log-in. For example, the secure log-in can be formed by requiring a user name and password to access the remote central server. The encryption module can encrypt any transmission of the required user name and password.

The encryption module can include computer instructions to verify the log-in. For example, the log-in can be verified by comparing a received user name and password with authorized user name and passwords stored in the remote central server data storage. The encryption module can ensure that the user associated with the user name and password is authorized to access particular data in the central server, and is authorized to perform particular actions in the central server.

The encryption module can include computer instructions to encrypt drilling data with a symmetric data encryption algorithm. For example, the drilling data can be encrypted using a key and a cipher algorithm to encrypt and decrypt the drilling data.

At least one remote client device can be connected to or otherwise in communication with a network, such as the Internet, a cellular network, or any other communications network. The remote client device can communicate with the remote central server. Each remote client device can be a laptop, desktop computer, mobile phone, personal digital assistant, netbook, or the like. Each remote client device can be configured to receive data from the remote central server in a real-time stream, including the drilling data, associated well logging data, the well log, and the executive dashboard. For example, the remote client devices can receive and present the data on a web browser. As such, users can remotely view the executive dashboard of the drilling data and the well logging data.

In one or more embodiments, the remote network operations center can be a virtual network operations center that is run from additional servers connected to the network. Also, a virtual network operations center can be used in conjunction with a physical remote network operations center.

In one or more embodiments, the network can be a combination of at least two networks. The network can be a satellite network, the Internet, a cellular network, a fiber optic network, another wired network, a category 5e network, another wireless network, a WI-FI™ network, or combinations thereof.

Each power supply can be a plurality of batteries, a bank of batteries, a wind generator, a solar array, a rig generated power supply, or another power supply.

In one or more embodiments, the remote central server can include a plurality of processors, such as from about 2 processors to about 20 processors, that can be connected in parallel or series to a switch, the central server data storage, and a third power supply.

The plurality of processors can use the central polling drop point to pick up drilling data from other manned logging units, record the drilling data, store the drilling data, and post the drilling data provided from the rig based client devices and the other manned logging units. The central polling drop point can be a folder or directory accessible via a file transfer protocol (FTP) server, a folder or directory that is accessible via a website using various HTTP protocols or instructions, or the like. The other manned logging units can be mobile field laboratories that create hydrocarbon well logs via automatic processes and/or manual analysis. The drilling data can be transmitted to the rig based WITS processor, rig based client devices, the remote client devices, and to a website presented by the central server. The website can be streamed through the network for presentation on web browsers of the remote client devices. The plurality of processors can increase efficiency, speed, and reliability of the system.

In one or more embodiments, the central server can have client accounts stored therein. The client accounts can include user names, passwords, names, and contact information for each user.

In one or more embodiments, the central server can have information input therein. The information can include information and data received from the other manned logging units, including information about the wellbores, well header information, such as operator names, location information, well names, and the like.

In one or more embodiments, the central server can monitor, or can be used to monitor, data traffic to the central polling drop point for the center server processor. For example, monitoring the data traffic to the central polling drop point can include identifying when new files arrive to a folder or directory, and transferring that new data to at least one of the center server processors for storage and filing. Monitoring the data traffic can include compiling the data with existing data in already existing folders or directories.

In one or more embodiments, the central server can monitor, or be used to monitor, drilling data for use in generating the well log and storing and displaying the drilling data as a real-time stream. The monitoring of the drilling data for use in storing and displaying as real-time streaming drilling data can include determining a presence of a change in the drilling data for real-time streaming of the drilling data.

Turning now to the Figures, FIG. 1 depicts a diagram of the system at a drilling rig 9.

Two rig based client devices 10a and 10b can each have an internet connection 13a and 13b, a WITS connection 15a and 15b, a VoIP connection 17a and WI-FI™ connection 21a and 21b. As such, each rig based client device 10a and 10b can have multiple communication channels for receipt and transmission of drilling data 8 and for other communications.

Each rig based client device 10a and 10b can be in communication with first power supplies 11a and 11b for receipt of power therefrom.

Each rig based client device 10a and 10b can be in communication with one of a first rig based radio box 14a and/or a second rig based radio box 14b. At least one of the rig based radio boxes, such as the second rig based radio box 14b, can be connected to one of the first power supplies, such as the first power supply 11b.

A third rig based radio box 14c can be connected to or in communication with one or both of the first and second rig based radio boxes 14a and 14b. The combination of the first, second, and third rib based radio boxes 14a, 14b, and 14c can form a rig based local area network 16.

A rig based router and switch 18 can be in communication with the rig based local area network 16, a rig based satellite modem 40, and a rig based WITS processor 20.

The rig based WITS processor 20 can be in communication with a WITS data storage 22, which can be a flash drive, a hard drive, a disc drive, or another form of data storage.

A second power supply 19 can be connected to the rig based WITS processor 20, the rig based router and switch 18, and the rig based satellite modem 40 for supplying power thereto.

The rig based satellite modem 40 can be in bidirectional communication with a self-aligning satellite dish 38. The self-aligning satellite dish 38 can be in communication with a satellite network 42. The satellite network 42 can be in communication with a first manned logging unit 88a, a second manned logging unit 88b, and a network operations center 44.

The network operations center 44 can be located remote from the drilling rig 9. The network operations center 44 can be in communication with a virtual network operations center 45.

An encrypted connection 63 can provide encrypted communication between the network operations center 44 and a remote central server 46. The remote central server 46 can be in communication with a first network 62a and a second network 62b. The first and second networks 62a and 62b can be cellular networks, the Internet, or other networks disclosed herein.

Three remote client devices 64a, 64b, and 64c can be in communication with the first network 62a, the second network 62b, or combinations thereof.

In operation, the rig based client devices 10a and 10b can receive the drilling data 8 from sensors, monitors, measurement devices, and other such instruments used for collecting data on the drilling rig 9, such as from a sensor 71. The rig based client devices 10a and 10b can transmit the drilling data 8 to the rig based radio boxes 14a, 14b, and 14c through the rig based local area network 16.

The rig based radio boxes 14a, 14b, and 14c can transmit the drilling data 8 to the rig based router and switch 18 through the rig based local area network 16. The rig based router and switch 18 can transmit the drilling data 8 to the WITS data storage 22, such as by communication with the rig based WITS processor 20. The drilling data 8 can then be stored on the WITS data storage 22.

The rig based WITS processor 20 can use one or more computer instructions in the WITS data storage 22 to form well logging data for transmission to the remote client devices 64a, 64b, and 64c through the rig based router switch 18 and the satellite network 42. The rig based WITS processor 20 can use one or more computer instructions in the WITS data storage 22 to transmit the drilling data 8 through the rig based router and switch 18 to the rig based satellite modem 40. The rig based satellite modem 40 can transmit the drilling data 8 to the self-aligning satellite dish 38 and through the satellite network 42 to the network operations center 44.

The network operations center 44 can receive the drilling data 8 from the self-aligning satellite dish 38 and other drilling data from the manned logging units 88a and 88b. The network operations center 44 can transmit the received drilling data 8 from the self-aligning satellite dish 38 and other drilling data from the manned logging units 88a and 88b to the remote central server 46.

The remote central server 46 can receive, compile, and store the received drilling data 8. The remote central server 46 can perform various tasks and operations on the drilling data 8 using the various computer instructions stored on a central data storage. For example, the remote central server 46 can form an executive dashboard and a well log of the drilling data 8 for presentation to user. The remote central server 46 can transmit the drilling data 8 through the first and second networks 62a and 62b to a plurality of remote client devices, such as the remote client devices 64a, 64b, and 64c. As such, remote users can receive real-time streaming drilling data 8 on an executive dashboard from a remote location from the drilling rig 9. The remote central server 46 can activate an alarm 33 if the drilling data 8 exceeds or falls below a preset limit.

FIG. 2 depicts an embodiment of the WITS data storage 22.

The WITS data storage 22 can include computer instructions to receive, store, and send the drilling data and the associated well logging data 24.

The WITS data storage 22 can include computer instructions to store configurations and settings for the plurality of rig based client devices, the rig based WITS processor, the rig based router and switch, or combinations thereof 26.

The WITS data storage 22 can include computer instructions to perform diagnostics on the plurality of rig based client devices using diagnostic tools 27.

The WITS data storage 22 can include computer instructions to online configure and reconfigure the rig based WITS processor, the rig based router and switch, the rig based client devices, or combinations thereof while the rig based wireless local area network is operating without shutting the rig based wireless local area network down 28.

The WITS data storage 22 can include computer instructions to perform diagnostics on the rig based wireless local area network 30.

FIG. 3 depicts an embodiment of the encryption module 70, which can include computer instructions to form a secure log-in 72, computer instructions to verify the secure log-in 74, computer instructions to provide a security certificate verifiable by a trusted third party 76, and computer instructions in the encryption module to encrypt the drilling data with a symmetric data encryption algorithm 78.

Figure 4:
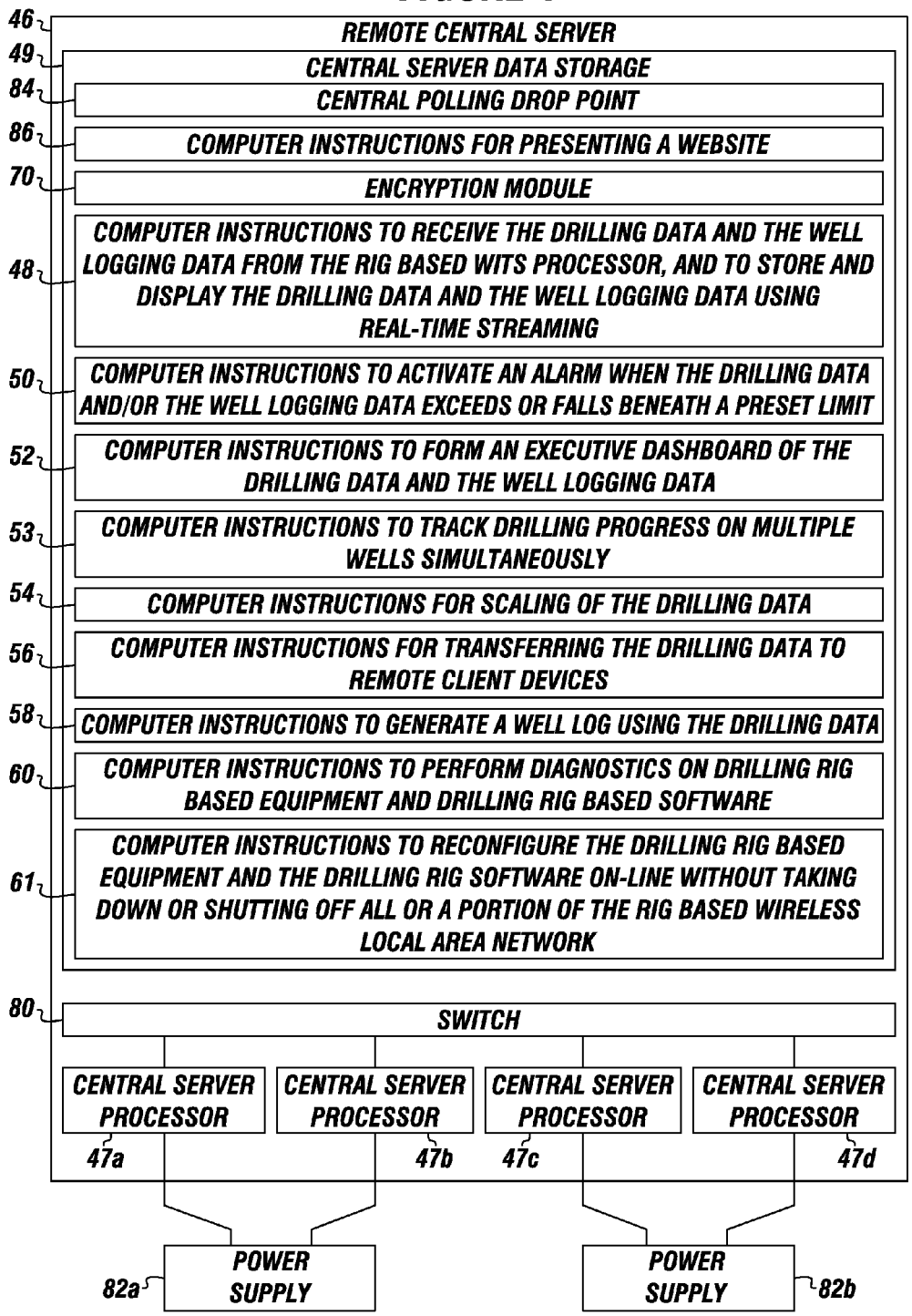
FIG. 4 depicts an embodiment of a remote central server.

FIG. 4 depicts an embodiment of a remote central server 46. The remote central server 46 can include a plurality of central server processors 47*a*, 47*b*, 47*c* and 47*d* connected in parallel to a switch 80. The plurality of central server processors 47*a*, 47*b*, 47*c* and 47*d* can be connected to two different power supplies 82*a* and 82*b*.

The remote central server 46 can include a central server data storage 49 with a central polling drop point 84, computer instructions for presenting a website 86, and the encryption module 70.

The central server data storage 49 can include computer instructions to receive the drilling data and the well logging data from the rig based WITS processor, and to store and display the drilling data and the well logging data using real-time streaming 48.

The central server data storage 49 can include computer instructions to activate an alarm when the drilling data and/or the well logging data exceeds or falls beneath a preset limit 50.

The central server data storage 49 can include computer instructions to form an executive dashboard of the drilling data and the well logging data 52.

The central server data storage 49 can include computer instructions to track drilling progress on multiple wells simultaneously 53.

The central server data storage 49 can include computer instructions for scaling of the drilling data 54.

The central server data storage 49 can include computer instructions for transferring the drilling data to remote client devices 56.

The central server data storage 49 can include computer instructions to generate a well log using the drilling data 58.

The central server data storage 49 can include computer instructions to perform diagnostics on drilling rig based equipment and drilling rig based software 60.

The central server data storage 49 can include computer instructions to reconfigure the drilling rig based equipment and the drilling rig software on-line without taking down or shutting off all or a portion of the rig based wireless local area network 61.

Figure 5:
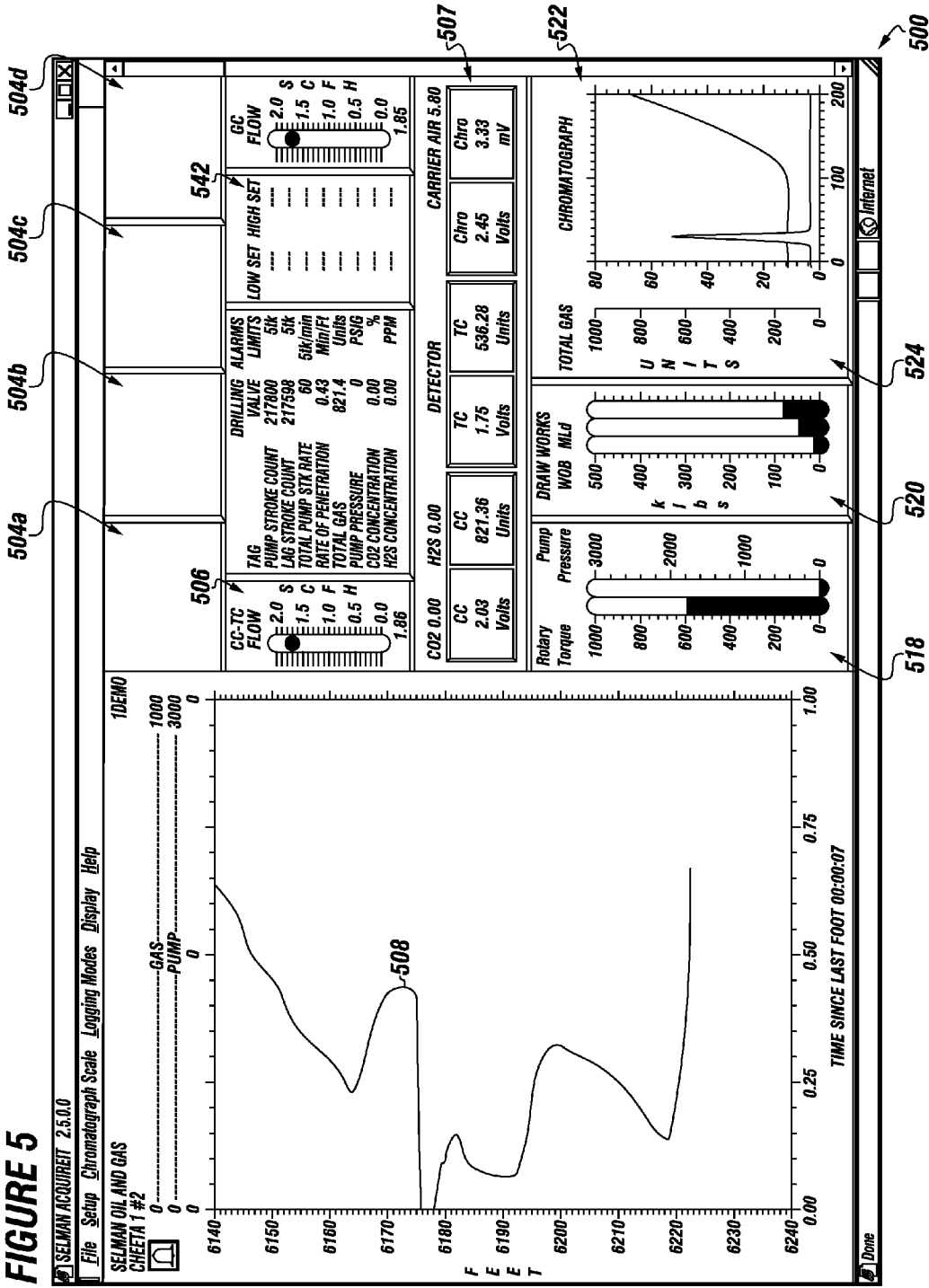
FIG. 5 depicts an embodiment of an executive dashboard.

FIG. 5 depicts a segment of an executive dashboard 500 that can be viewed by operators, executives, and the like.

The executive dashboard 500 can include a graphical representation of drilling data 508, a representation of calibrated drilling data related to flow rates 506, an acquired drilling data section 507, a calibrated pump data section 518, a calibrated draw works section 520, a graphical representation of chromatograph data 522, an alarm set section 542, and an acquired chromatograph data section 524. The acquired chromatograph data section 524 can display important voltage parameters for a chromatograph monitoring device acquiring the drilling data.

The executive dashboard 500 can also include operator data track sections 504*a*, 504*b*, 504*c*, and 504*d*. The operator data track sections 504*a*, 504*b*, 504*c*, and 504*d* can display calibrated drilling data associated with one or more drilling operations. For example, the operator data track sections 504*a*, 504*b*, 504*c*, and 504*d* can display hydrocarbon data, pump data, or other drilling data.

The alarm set section 542 can include a section for an operator to input or select alarm criteria. For example, the operator can set a low value alarm point, a high value alarm point, or both. As such, if drilling data reaches one of the alarm points an alarm can be issued.

FIG. 6 depicts a display of a well log 850 that can be presented on a remote client device as live stream data. The remote client device can display various drilling data, calibrated data, or combinations thereof for one or more drilling operations in a real-time stream. The drilling data can be displayed using a plurality of digital data displays 810. The plurality of digital displays 810 can include a current data display area 812 showing a currently measured data point, a units section 830 showing the unit associated with the currently measured data point, and a name section 820. The name section 830 can identify the property associated with the drilling data related to the currently measured data point.

The remote client device can various portions of the drilling data disclosed herein, such as hole depth, bit depth, lag depth, total gas, methane, ethane, propane, isobutane, norbutane, drill rate, hook load, pump pressure, pump stroke rate, lag strokes, torque, carrier pressure, vendor name or number, temperature, flow rate, fuel level, a wellbore identification number to identify the wellbore being monitored, and the like.

Figure 7C:
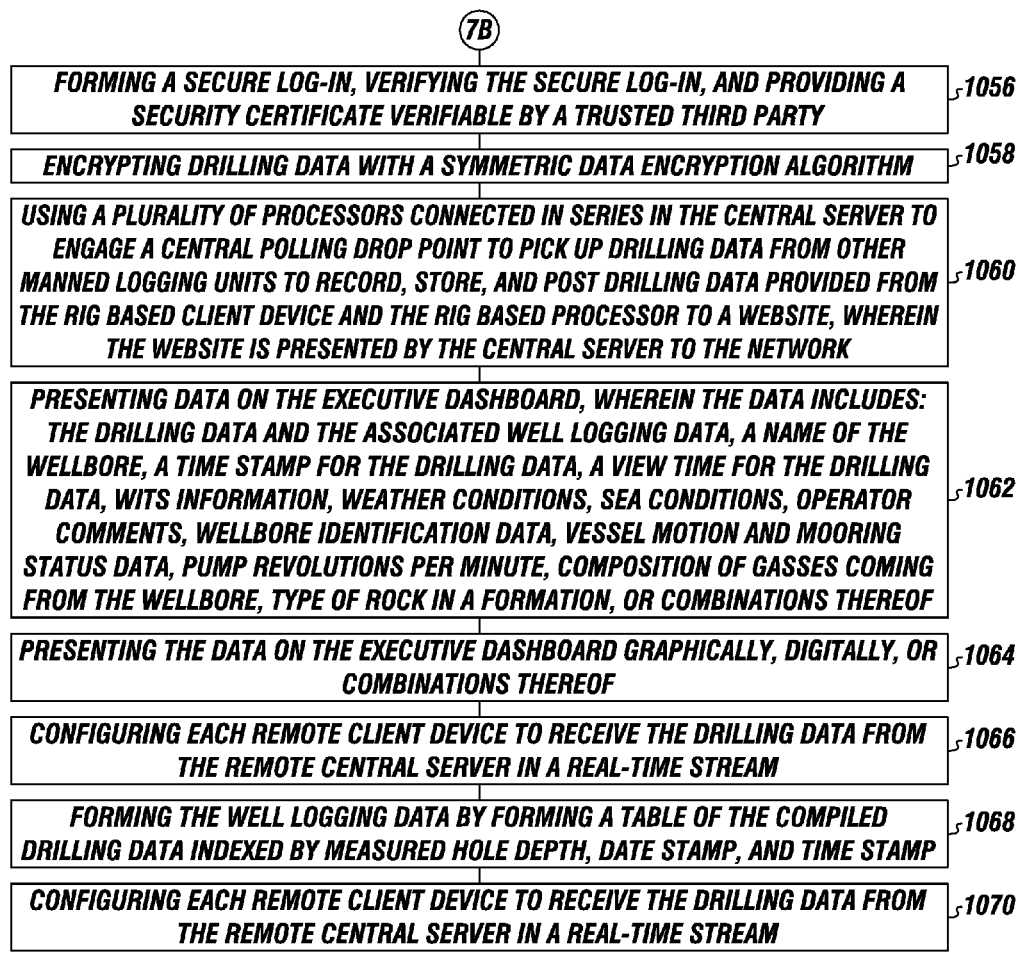

FIGS. 7A-7C depict an embodiment of a method for providing well logging and drilling data transmission services.

The method can include using a secure connection to provide communication between a plurality of rig based client devices and interconnected rig based radio boxes, as illustrated by box 1000.

The method can include providing communication between the rig based client devices and sensors, monitoring devices, measurement instruments, or combinations thereof, as illustrated by box 1001.

The method can include performing at least one of: receiving and transmitting the drilling data and the associated well logging data, sending and receiving phone calls, sending and receiving queries over the internet, and sending and receiving communications using the WI-FI™ connection, as illustrated by box 1002.

The method can include using the rig based client devices to receive the drilling data from the sensors, monitoring devices, measurement instruments, or combinations thereof, as illustrated by box 1003.

The method can include creating a rig based wireless network using the interconnected rig based radio boxes, as illustrated by box 1004.

The method can include communicating between the plurality of rig based client devices and a rig based processor over the rig based wireless local network to receive and transmit the drilling data and the associated well logging data, as illustrated by box 1006.

The method can include using the rig based processor to transmit the drilling data and the associated well logging data to a satellite network using a rig based router and switch connected to a satellite modem, as illustrated by box 1008.

The method can include using a self-aligning satellite dish to receive the drilling data and the associated well logging data from the satellite modem and to transmit the drilling data and the associated well logging data to the satellite network, as illustrated by box 1010.

The method can include real-time streaming the drilling data including associated well logging data from the drilling rig using self-aligning satellites, as illustrated by box 1012.

The method can include communicating the drilling data and associated well logging data from the satellite network to a remote network operation center using an encrypted connection, as illustrated by box 1014.

The method can include communicating the drilling data and associated well logging data from the remote network operation center to a remote central server, as illustrated by box 1016.

The method can include using the remote central server to receive, store, and display in real-time streaming drilling data and associated well logging data, as illustrated by box 1018.

The method can include using the remote central server to activate an alarm when the drilling data or associated well logging date exceeds or falls beneath a preset limit, as illustrated by box 1020.

The method can include using the remote central server to form an executive dashboard of the drilling data or associated well logging data, as illustrated by box 1022.

The method can include using the remote central server to track drilling progress on multiple wells, as illustrated by box 1024.

The method can include using the remote central server to scale the drilling data, as illustrated by box 1026.

The method can include using the remote central server to transfer the drilling data and the associated well logging data a remote client device, as illustrated by box 1028.

The method can include using the remote central server to a track drilling progress on multiple wells, scale drilling data, and combinations thereof, as illustrated by box 1030.

The method can include using the remote central server to generate a well log, as illustrated by box 1032.

The method can include using the remote central server to perform remote diagnostics and reconfigure software online without taking down the local wireless area network, as illustrated by box 1034.

The method can include using the remote central server to stream the drilling data, the associated well logging data, the executive dashboard, or combinations thereof to the remote client device for display thereon, as illustrated by box 1036.

The method can include creating client accounts in the central server, as illustrated by box 1038.

The method can include inputting information on other manned logging units, as illustrated by box 1040.

The method can include monitoring data traffic to a central polling drop point for the processor, as illustrated by box 1042.

The method can include monitoring drilling data for use in generating a well log, as illustrated by box 1044.

The method can include monitoring the drilling data for use in storing and displaying as real-time streaming drilling data, as illustrated by box 1046.

The method can include using a virtual network operations center as the network operations center, as illustrated by box 1048.

The method can include using a virtual network operations center with the network operations center, as illustrated by box 1050.

The method can include using at least two connected networks as the network, as illustrated by box 1052.

The method can include using an encryption module to provide an encrypted communication between the network operation center and the central server, and secure communication from a user with a client device or a rig based client device, as illustrated by box 1054.

The method can include forming a secure log-in, verifying the secure log-in, and providing a security certificate verifiable by a trusted third party, as illustrated by box 1056.

The method can include encrypting drilling data with a symmetric data encryption algorithm, as illustrated by box 1058.

The method can include using a plurality of processors connected in series in the central server to engage a central polling drop point to pick up drilling data from other manned logging units to record, store, and post drilling data provided from the rig based client device and the rig based processor to a website, wherein the website is presented by the central server to the network, as illustrated by box 1060.

The method can include presenting data on the executive dashboard, wherein the data includes: the drilling data and the associated well logging data, a name of the wellbore, a time stamp for the drilling data, a view time for the drilling data, WITS information, weather conditions, sea conditions, operator comments, wellbore identification data, vessel motion and mooring status data, pump revolutions per minute, composition of gasses coming from the wellbore, type of rock in a formation, or combinations thereof, as illustrated by box 1062.

The method can include presenting the data on the executive dashboard graphically, digitally, or combinations thereof, as illustrated by box 1064.

The method can include compiling the drilling data, and tracking changes in the drilling data, as illustrated by box 1066.

The method can include forming the well logging data by forming a table of the compiled drilling data indexed by measured hole depth, date stamp, and time stamp, as illustrated by box 1068.

The method can include configuring each remote client device to receive the drilling data from the remote central server in a real-time stream, as illustrated by box 1070.

While these embodiments have been described with emphasis on the embodiments, it should be understood that within the scope of the appended claims, the embodiments might be practiced other than as specifically described herein.

What is claimed is:

1. A method for providing well logging and drilling data transmission services and for real-time streaming the drilling data including associated well logging data from a drilling rig using self-aligning satellites, the method comprising:
   a. securely connecting for communication between:
      (i) a plurality of rig based client devices, wherein each rig based client device comprises an Internet connection, a well site information transfer specification "WITS" connection, a Voice over Internet Protocol phone connection, and a WI-FI™ connection; and
      (ii) interconnected rig based radio boxes;
   b. performing by the plurality of rig based client devices:
      (i) receiving and transmitting the drilling data and the associated well logging data;
      (ii) sending and receiving phone calls;
      (iii) sending and receiving queries over the Internet; and
      (iv) sending and receiving communications using the WI-FI™ connection;
   c. creating a wireless rig based local area network using the interconnected rig based radio boxes;
   d. communicating between the plurality of rig based client devices and a rig based WITS processor over the rig based local area network to receive and transmit the drilling data and the associated well logging data;
   e. transmitting the drilling data and the associated well logging data from the WITS rig based processor to a satellite network using a rig based router and switch connected to a satellite modem;

f. receiving the drilling data and the associated well logging data from the satellite modem connected to a self-aligning satellite dish and to transmit the drilling data and the associated well logging data to the satellite network;

g. communicating the drilling data and associated well logging data from the satellite network to a remote network operation center using an encrypted connection;

h. communicating the drilling data and associated well logging data from the remote network operation center to a remote central server with a central server processor and a central server data storage the remote central server in communication with a plurality of remote client devices; and i. performing by the remote central server processor to:
   (i) receive, store, and display in real-time streaming the drilling data and the associated well logging data;
   (ii) form an executive dashboard of the drilling data and the associated well logging data for display on the remote central server device or on the display of one of the plurality of remote client devices;
   (iii) scale the drilling data;
   (iv) transfer the drilling data and the associated well logging data to at least one of the plurality of remote client devices;
   (v) generate a well log; and
   (vi) stream the drilling data, the associated well logging data, the executive dashboard, the well log, to the remote client device for display thereon and perform at least one of:
      1. activate an alarm when the drilling data or the associated well logging date exceeds or falls beneath a preset limit;
      2. track drilling progress on multiple wells; and
      3. perform remote diagnostics and reconfigure software online without taking down the rig based local area network.

2. The method of claim 1, further comprising:
a. creating client accounts in the remote central server;
b. inputting information on other manned logging units into the remote central server;
c. monitoring data traffic to a central polling drop point of the remote central server;
d. monitoring the drilling data for use in generating the well log; and
e. monitoring the drilling data for use in storing and displaying the drilling data as real-time streaming drilling data.

3. The method of claim 1, further comprising using a virtual network operations center as the remote network operations center or using the virtual network operations center with the remote network operations center.

4. The method of claim 1, further comprising using a network to transmit the drilling data, the associated well logging data, the executive dashboard, the well log, or combinations thereof to the remote client device for display thereon.

5. The method of claim 4, wherein the network is a satellite network, the Internet, a cellular network, a fiber optic network, another wired network, a category 5e network, another wireless network, a WI-FI™ network, or combinations thereof.

6. The method of claim 1, further comprising using an encryption module in a data storage of the remote central server to provide:

a. an encrypted communication between the remote network operation center and the remote central server; and
b. secure communication from a user with the remote client device or one of the plurality of rig based client devices.

7. The method of claim 6, further comprising forming a secure log-in, verifying the secure log-in, and providing a security certificate verifiable by a trusted third party for the user.

8. The method of claim 1, further comprising encrypting the drilling data with a symmetric data encryption algorithm.

9. The method of claim 1, further comprising using a power supply to power components at the drilling rig, wherein the power supply is a plurality of batteries, a bank of batteries, a wind generator, a solar array, or a rig generated power supply.

10. The method of claim 1, wherein the remote central server comprises a plurality of processors connected in parallel to a switch, to a data storage, and to a power supply.

11. The method of claim 10, further comprising using the plurality of processors connected in parallel to:
a. engage a central polling drop point to pick up other drilling data from other manned logging units; and
b. record, store, and post the drilling data provided from the plurality of rig based client devices and the other drilling data provided from the other manned logging units to a website, wherein the website is presented by the remote central server through a network to the remote client device.

12. The method of claim 1, further comprising:
a. providing communication between the plurality of rig based client devices and sensors, monitoring devices, measurement instruments, or combinations thereof; and
b. using the plurality of rig based client devices to receive the drilling data from the sensors, monitoring devices, measurement instruments, or combinations thereof.

13. The method of claim 12, wherein the sensors, monitoring devices, and measurement instruments comprise: chromatographs, mud pumps, mud volume tantalizers, mud pit volume tantalizers, mud pit monitors, drill switches, gas sensors, depth sensors, on-off bottom switches, flame ionization detectors, catalytic combustion detectors, thermal conductivity detectors, infrared gas detectors, other gas detection devices, other gas measuring devices, weight on bit transducers, drill rig servers, or combinations thereof.

14. The method of claim 1, wherein the drilling data comprises: hole depth, drill bit depth, lag depth, total gas, methane content, ethane content, propane content, isobutene content, pump pressure, torque, carrier pressure, casing pressure, fluorescence, drilling mud content, well bore depths, chromatograms, lag time information, rate of penetration into the wellbore, weight on the drill bit, hook load, stand pipe pressure, pump stroke rate, rotary table speed, mud tank levels, measured depth of the wellbore, true vertical depth of the wellbore, measured depth of the drill bit, true vertical depth of the drill bit, measured depth at which the drilling data is received such as a depth of a geological or gas sample, gamma ray reading data, resistivity readings, caliber readings, temperature readings, any other data measured during the drilling of a wellbore, other related drilling information, or combinations thereof.

15. The method of claim 1, further comprising presenting data on the executive dashboard, wherein the data includes: the drilling data, the associated well logging data, a name of the wellbore, a time stamp for the drilling data, a view time for the drilling data, WITS information, weather conditions, sea conditions, operator comments, wellbore identification data, vessel motion and mooring status data, pump strokes per minute, composition of gasses coming from the wellbore, type of rock in a formation, or combinations thereof.

16. The method of claim 15, further comprising presenting the data on the executive dashboard graphically, digitally, or combinations thereof.

17. The method of claim 1, wherein the encrypted connection includes symmetric encryption, asymmetric encryption, RSA encryption, or combinations thereof.

18. The method of claim 1, further comprising configuring the remote client device to receive the drilling data from the remote central server in a real-time stream.

19. The method of claim 1, further comprising compiling the drilling data, and tracking changes in the drilling data.

20. The method of claim 19, further comprising forming the well logging data by forming a table of the compiled drilling data indexed by measured hole depth, date stamp, and time stamp.

* * * * *